United States Patent [19]

Fukahori et al.

[11] Patent Number: 4,761,925
[45] Date of Patent: Aug. 9, 1988

[54] ANTI-SEISMIC RUBBER BEARING

[75] Inventors: Yoshihide Fukahori, Hachioji; Wataru Seki, Kodaira; Toshikazu Yoshizawa, Hachioji; Shigenobu Suzuki, Kodaira; Takeshi Suga, Kawasaki; Mitsuaki Maeda, Hoya; Akihiko Ogino, Kodaira, all of Japan

[73] Assignee: Bridgestone Corporation, Tokyo, Japan

[21] Appl. No.: 27,283

[22] Filed: Mar. 17, 1987

[30] Foreign Application Priority Data

Mar. 31, 1986 [JP] Japan ................................ 61-74040
Apr. 10, 1986 [JP] Japan ................................ 61-82852

[51] Int. Cl.$^4$ ........................................... E02D 27/34
[52] U.S. Cl. ..................................... 52/167; 248/609; 248/621
[58] Field of Search ........................ 52/167; 14/16.1; 248/609, 621

[56] References Cited

U.S. PATENT DOCUMENTS 3,544,176 12/1970 Slater ............................. 14/16.1 X
4,527,365 7/1985 Yoshizawa et al. ................. 52/167

Primary Examiner—Carl D. Friedman
Attorney, Agent, or Firm—Frank J. Jordan; C. Bruce Hamburg; Manabu Kanesaka

[57] ABSTRACT

There is provided an anti-seismic rubber bearing made up of a laminate structure formed by bonding a plurality of rigid plates having stiffness properties and a plurality of flexible plates having viscoelastic properties each other alternately, and flanges each attached to the upper and lower surfaces of the laminate structure, characterized by that the local strain is evenly distributed throughout the structure by lowering the local strain which occurs near the flanges.

12 Claims, 8 Drawing Sheets

FIG. 11 PRIOR ART  FIG. 12 PRIOR ART
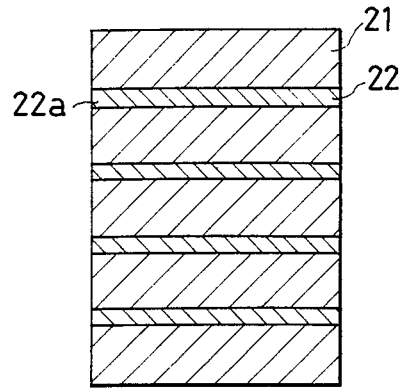
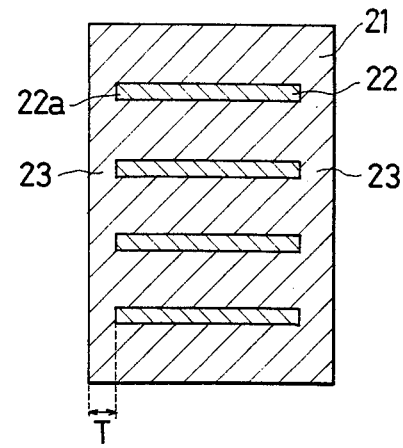
FIG. 13
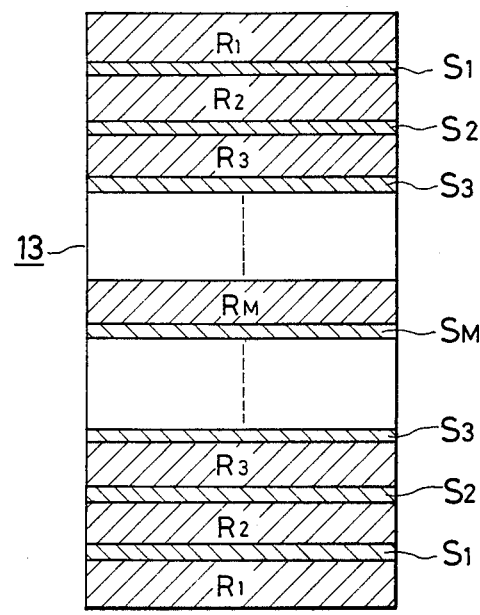

ANTI-SEISMIC RUBBER BEARING

FIELD OF THE INVENTION AND RELATED ART STATEMENT

The present invention relates to an anti-seismic rubber bearing of such a structure that a plurality of rigid plates and a plurality of flexible plates having visoelastic properties are bonded to each other alternately. More particularly, it relates to an anti-seismic rubber bearing which is superior in anti-seismic performance and durability and is capable of being stably fixed to both the building and the foundation on account of the structure to reduce the local strain which occurs near the flanges.

Much attention is now focused on the structure (anti-seismic rubber bearing) formed by laminating alternately rigid plates such as steel plates and flexible plates such as rubber plates having the viscoelastic properties, because it satisfies the vibration insulating and absorbing properties required for the anti-seismic bearing member.

The anti-seismic rubber bearing has flexibility or has a low shear modulus in the horizontal direction. Because of this property, it shifts own frequency of a rigid concrete building from the seismic frequency, when it is interposed between the concrete building and the foundation thereof. For this reason, the anti-seismic rubber bearing greatly reduces the acceleration of earthquake the building receives.

As mentioned above, the anti-seismic rubber bearing has a bearing member interposed between a building and a foundation thereof so that it supports the entire building. Therefore, once it is installed, its replacement is technically difficult or economically unrealistic. This requires the anti-seismic structure to have the same service life (50–60 years) as concrete structures.

As shown in FIG. 2(a), the anti-seismic rubber bearing 10 is made up of a laminate structure 1 and flanges 4 and 5. The laminate structure 1 is made up of flexible plates $R_1$, $R_2$, $R_3$, . . . and rigid plates $S_1$, $S_2$, $S_3$, . . . placed on top of the other. The flanges 4 and 5 are thick steel plates firmly bonded to the top and bottom of the laminate structure 1, respectively. The flange 4 is in contact with a building, and the flange 5 is in contact with a foundation.

The anti-seismic rubber bearing 10 is characterized by its elastic deformation or its ability to recover its original shape after deformation by earthquake. Because of this property, the anti-seismic rubber bearing 10 undergoes great shear deformation as the building shakes during a big earthquake, as shown in FIG. 2(b). In other words, the flexible plates $R_1$, $R_2$, . . . interposed between the rigid plates $S_1$, $S_2$, . . . undergo tensile deformation as great as hundreds percent. Among the flexible plates, the one ($R_2$) adjacent to the flange undergoes an extremely great local deformation at the part (X) where the rigid plate $S_1$ is bent in the direction of arrow in consequence of shear deformation. The local deformation has long been thought to be the cause of damage or break the anti-seismic structure.

Up to now, no careful analyses have been made relative to the local stress and strain which, when a great shear force is applied to the anti-seismic rubber bearing at the time of earthquake, occur in the anti-seismic rubber bearing supporting the weight of a building over a long period of time. It has been inferred from the approximate shape observed when an anti-seismic rubber bearing is actually deformed that the maximum strain takes place in the part X.

This inference led people in England and New Zealand to a belief that it is possible to prevent the great local strain from occurring in part A of the anti-seismic rubber bearing and thereby to prevent an anti-seismic rubber bearing 10' from being damaged and broken, if flanges 8 and 9 of the anti-seismic rubber bearing 10' are provided with recesses 8a, 8b, 9a, and 9b which are engaged with bolts 2a, 2b, 3a, and 3b attached to the building 2 and the foundation 3, as shown in FIG. 3(a). (This is called "dowel system".) This system permits the flanges 8 and 9 to bend in the directions of arrows as shown in FIG. 3(b) during earthquake, so that no great local strain occurs in part A of the anti-seismic rubber bearing.

It is well known that a rigid building like a concrete building placed on a flexible structure like an anti-seismic rubber bearing is subject to not only simple horizontal motion but also vertical motion and rotating motion, when it is shaken vertically and horizontally by an earthquake. These complex motions cause the rocking of a building. Therefore, the anti-seismic rubber bearing should be firmly and completely fixed to the sill and foundation through the flanges.

This principle, however, is not applied to the conventional technology shown in FIGS. 3(a) and 3(b), in which the flanges 8 and 9 are fixed to neither the building 2 nor the foundation 3 but are constructed such that they bend in proportion to shear deformation. This construction makes the building extremely unstable and subject to tilting induced by strong rocking. It may be said, therefore, that in England and New Zealand great importance is directed to the reduction of local strain near the flange rather than the stability of a building.

For reasons mentioned above, there has been a need for an anti-seismic rubber bearing which is subject to very little local stress and local strain even when it is fixed to a building or foundation through the flanges. (In this specification, this type of anti-seismic rubber bearing is referred to as "foundation-fixed anti-seismic rubber bearing).

In the case of a bearing member compound of rigid plates (such as steel plate) and flexible plates (such as rubber plates) laminated on top of the other, excessive stress and strain occur at that part of the flexible plate which is in contact with the edge of the rigid plate, and that part is subject to damage. This is a well known fact.

A known way of reducing the local stress in that part of a flexible plate which is in contact with the edge of a rigid plate is to make the side of the flexible plate 21 concave as shown in FIG. 9 which is a longitudinal sectional view of a conventional rubber bearing member. Making the side of each flexible plate concave is disadvantageous in the case of anti-seismic rubber bearing composed of rigid plates and flexible plates laminated alternately, because it causes poor demolding and needs an expensive mold. This drawback is more serious in the case where the flexible plates are thin.

A disadvantage of the conventional anti-seismic rubber bearing of laminate structure is that the edges of the rigid plates such as steel plates are exposed and they are subject to corrosion. In the case of rubber vibration isolator, the exposed side of the metal plate is covered with coating; but this coating is not adequate for the anti-seismic rubber bearing which is required to be durable over a long period of time (e.g., 60 years for concrete buildings).

Since the anti-seismic rubber bearing is exposed to the atmosphere at all times while it is in use, it is degraded by air, moisture, ozone, ultraviolet light, radiation (when used for a nuclear power station), and sea wind (when used for a seacoast building) over a long period of time. In addition, the anti-seismic rubber bearing supporting a building is under compressive load at all times, which in turn exerts a considerably large amount of tensile stress to the surface of the rubber layer. Compressive strain up to 10% may cause tensile strain of 100–300% on the surface if there is a large amount of creep after use for a long period. This surface strain is magnified by the shear strain amounting to 100–200% that takes place at the time of earthquake. Such tensile stress and tensile strain promote the degradation of the anti-seismic rubber bearing by the atmosphere. For this reason, it is important to minimize the tensile strain in the surface of the anti-seismic rubber bearing and to make the anti-seismic rubber bearing from a rubber of good weather resistance.

With the foregoing in mind, the present inventors reviewed the structure of the conventional anti-seismic rubber bearing from the standpoint of the surface tensile strain and weather resistance. At present, there are two types of anti-seismic rubber bearings as shown in FIGS. 11 and 12. The one shown in FIG. 11 is composed of rubber layers 21 and metal plates 22 laminated on top of the other, with the edge 22a of the metal plate 22 exposed or covered with a thin (0.5–1 mm) rubber layer. The one shown in FIG. 12 is composed of rubber layers 21 and metal plates 22 laminated on top of the other, with the edge 22a of metal plates 22 covered with a thick rubber layer 23.

The rubber material used for these anti-seismic structure is either natural rubber in England and New Zealand where importance is directed to fracture resistance or chloroprene in France where importance is directed to weather resistance. In the former two countries, the anti-seismic rubber bearing is covered with a thick rubber layer to compensate the poor weather resistance (heat aging resistance, ozone resistance, and oxidation resistance) of natural rubber as shown in FIG. 12. (For example, the surface rubber layer is 75 mm thick in the case of anti-seismic rubber bearing used for a courthouse built in the suburbs of Los Angeles.)

The conventional anti-seismic rubber bearing made of chloroprene rubber with good weather resistance has a drawback of being poor in creep properties. This is because chloroprene rubber has a great hysteresis loss. In addition, it becomes stiffer at low temperatures because chloroprene easily crystallizes at low temperatures. The high price of chloroprene rubber is another disadvantage.

On the other hand, natural rubber is poor in weather resistance as well known. Degraded natural rubber is noticed by its visible change such as ozone cracking; it is also characterized by a greatly increased modulus and a greatly decreased strength and elongation at break. After degradation over a long period of time in the atmosphere, natural rubber has a myriad of ozone crackings on the surface thereof and becomes brittle.

The poor weather resistance of natural rubber causes a problem in the case of anti-seismic rubber bearing constructed as shown in FIG. 12. The degraded surface layer easily breaks when the anti-seismic rubber bearing undergoes great deformation repeatedly at the time of earthquake, even though the inner rubber is not degraded. Then the broke surface layer triggers the rupture of all the rubber layers. (This is experimentally demonstrated by the fact that a specimen of rubber having good heat aging characteristics is easily broken when merely bent if it is coated thin with another rubber poor in heat aging characteristics, followed by heat aging.)

The degradation of the surface rubber layer of the anti-seismic rubber bearing causes another problem. Ozone cracking on the surface permits the infiltration of water, and water corrodes the rigid plates (or metal plates), giving rise to the delamination of metal plates and rubber layers.

In consideration of the following, the anti-seismic rubber bearing should be as resistant to degradation as possible in the environment where it is used. The anti-seismic rubber bearing is required to have a long durability over a period of about 60 years as mentioned above. The anti-seismic rubber bearing might be entirely broken even when a small part is degraded. Even the slightest degradation should not be neglected because the anti-seismic rubber bearing would receive an unexpected deformation. The anti-seismic rubber bearing should have the perfect safety becasue it supports a building and men living therein.

In common with all industrial products, the anti-seismic rubber bearing should be produced at a reasonably low cost. Therefore, the anti-seismic rubber bearing made of natural rubber, which is poor in weather resistance, should be covered with a special rubber with good weather resistance.

OBJECT AND SUMMARY OF THE INVENTION

It is an object of the present invention to provide an anti-seismic rubber bearing which can be stably and fixedly attached to a building and a foundation thereof.

It is another object of the invention to provide an improved anti-seismic rubber bearing characterized by that local strain is reduced and damage and breakage caused by local strain are greatly reduced while it is fixedly attached to a building and a foundation thereof.

The anti-seismic rubber bearing of the present invention comprises a laminate structure composed of a plurality of rigid plates and a plurality of flexible plates having viscoelastic properties bonded to each other alternately, and flanges each attached to the upper and lower surfaces of the laminate structure, characterized by that the local strain is evenly distributed throughout the structure by lowering the local strain which occurs near the flanges.

The present inventors studied the foundation-fixed type anti-seismic rubber bearing which is not damaged or broken by local strain. The study has begun with the analysis of a great deformation stress applied to a rubber material. Such an analysis is considered to give a clue to the location and magnitude of local strain which occurs in an anti-seismic rubber bearing as a result of compressive deformation exerted by a building and the shear deformation exerted by the horizontal movement of earthquake.

In order for an anti-seismic rubber bearing to support a building over a long period of time and to be quite safe against the motions of big earthquakes, theoretical designs are indispensable in place of conventional empirical designs.

The analysis of stress on a material is usually carried out by the finite element method (FEM) using a computer. Since the FEM analysis represents originally the stress-strain relationship of a material by the aid of linear approximation, the calculated values agree with the actual values in the case of very small deformation. However, this is not correct for large deformation.

In their studies, the present inventors employed a method of representing the non-linearity as faithfully as possible for such a rubber material as anti-seismic rubber bearing which undergoes extraordinary deformation. As the result, they obtained the results of analyses in which the calculated deformation (solid line) almost completely agrees with the measured deformation (broken line) when the compressive strain is 8.5% and the shear strain is 100%, as shown in FIG. 4.

In the next step, the present inventors investigated the deformation and strain of each part by applying 6% compressive strain and 100% shear strain to an anti-seismic rubber bearing composed of five rubber layers ($R_{11}$, $R_{12}$, $R_{13}$, $R_{12}$, $R_{11}$), four steel plates ($S_{11}$, $S_{12}$, $S_{13}$, $S_{12}$, $S_{11}$), and flanges 4 and 5, as shown in FIG. 5. In the case of deformation schematically shown in FIG. 6, the strain values at points A to E were as follows: Points A and B=138%, Points C and D=51%, and Point E=80%. (See column of Comparative Example in Table 1 given later.) This result indicates that a larger strain occurs in $R_{11}$ near the flange than in $R_{13}$ at the center.

As mentioned above, it has been empirically believed that great local stain occurs in the stretched side (part A in FIG. 6) near the flange when an anti-seismic rubber bearing undergoes shear deformation. However, the analyses carried out by the present inventors indicate that the great local strain in the rubber layer $R_{11}$ near the flange occurs not only at the stretched side A but also at the compressed side B.

Further investigation revealed the following. When an anti-seismic rubber bearing undergoes compression deformation and shear deformation, great local strain occurs at the stretched side A and the compressed side B near the flange. Such uneven distribution of local strain influences the adjacent rubber layer $R_{12}$. (If there are more rubber layers, those closer to the center are also influenced.) It was found that the reduction of local strain that occurs near the flange is indispensable for the development of the foundation-fixed type anti-seismic rubber bearing which receives very little damage and rupture caused by local strain. The present invention was completed on the basis of this finding.

The analyses carried out by the present inventors produced a very important knowledge on local strain. The dowel-type anti-seismic rubber bearing used in England and New Zealand is not completely safe from breakage by local strain near the flange; rather it is prone to danger of rocking. In the case of dowel-type one, the flange under tension bends as shown in FIGS. 3(a) and 3(b), relieving the local strain at part A. This structure, however, increases the local strain at part B, resulting in breakage at part B. The present invention is based on the analyses which were carried out successfully for the first time in the world.

BRIEF DESCRIPTION OF THE DRAWINGS

FIGS. 2 and 3 are longitudinal sectional views of conventional examples of anti-seismic rubber bearing.

FIGS. 11 and 12 are sectional views of conventional anti-seismic rubber bearings.

FIG. 13 is a sectional view of a laminate structure pertaining to another example of the invention.

DESCRIPTION OF THE PREFERRED EMBODIMENTS

Figure 1:
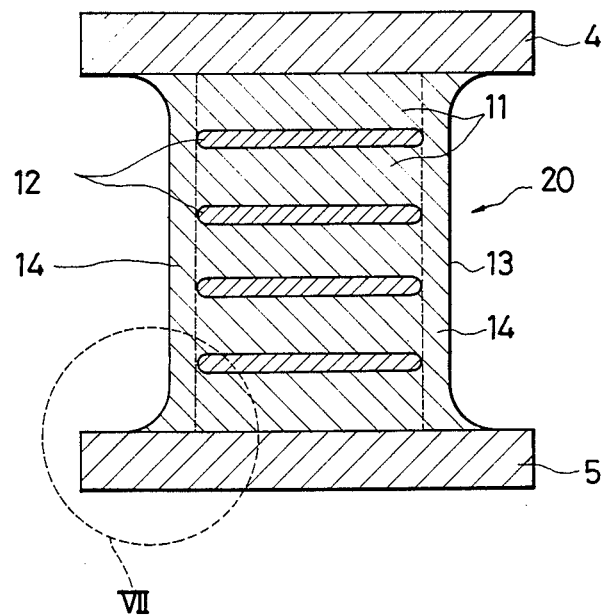
FIG. 1 is a longitudinal sectional view of the anti-seismic rubber bearing pertaining to one example of the invention.
Figure 2A:
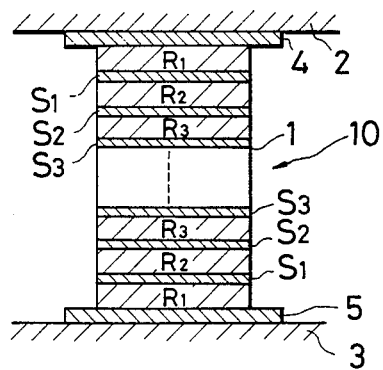
FIGS. 2(a) and 3(a) show the normal state and FIGS. 2(b) and 3(b) show the deformed state at the time of earthquake.
Figure 2B:
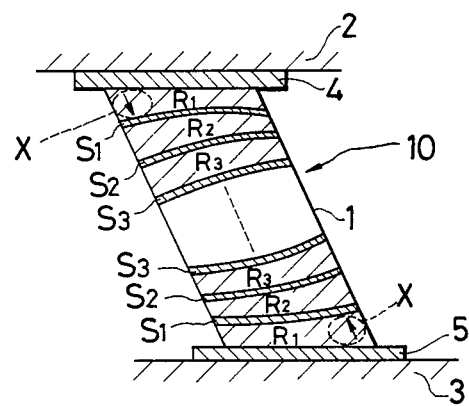
Figure 3A:
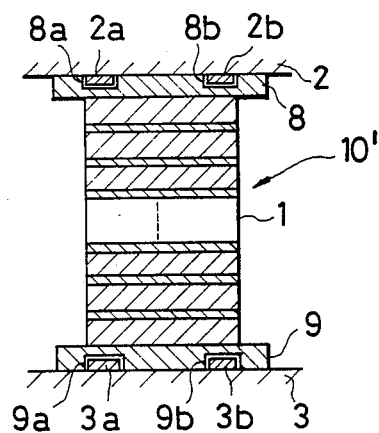
Figure 3B:
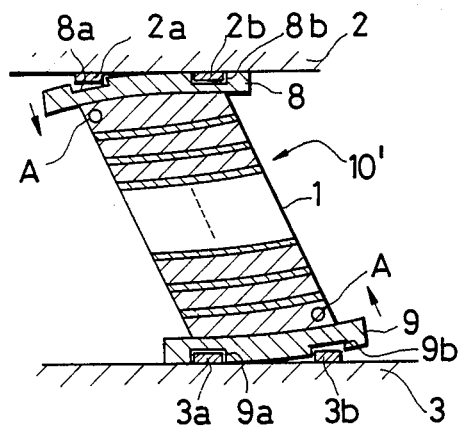
Figure 4:
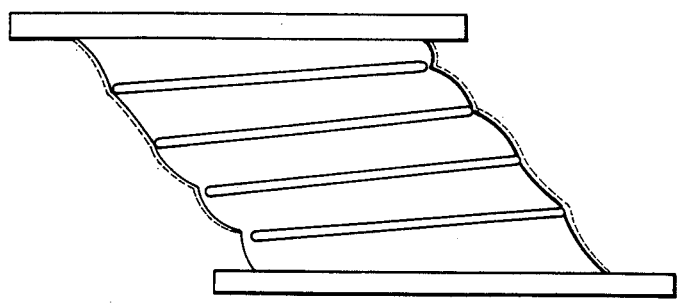
FIG. 4 is a diagram showing the results of FEM analysis of an anti-seismic rubber bearing.

FIG. 1 is a longitudinal sectional view of the anti-seismic rubber bearing 20 pertaining to one example of the invention. The anti-seismic rubber bearing consists of a laminate structure 13 and flanges 4 and 5 attached to the top and bottom thereof. The laminate structure 13 is composed of flexible plates 11 of rubber or the like having the viscoelastic property and rigid plates 12 of steel or the like having the rigid property, said plates being laminated alternately.

The laminate structure 13 has, in a sectional view, inward curvatures at four corners in contact with the flanges 4 and 5. The radius of the curvature should be properly selected. If it is too small, the curvature produces only little effect of reducing the local strain; and if it is too great, the production of anti-seismic rubber bearing is very difficult.

Figure 7:
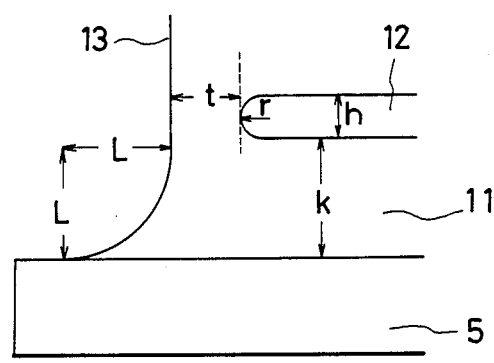
FIG. 7 is an enlarged view of part VII in FIG. 1.

Therefore, the radius (L) of the curvature should preferably be established such that the following equations are satisfied.

$$(1/15)(h+K) \leq L \leq 5(h+k),$$

more preferably:
$$(1/12)(h+K) \leq L \leq 4(h+K), \text{ and}$$

most desirably:

$$(1/10)(h+K) \leq L \leq 3(h+k)$$

where k is the thickness of the flexible plate 11 and h is the thickness of the rigid plate 12 shown in FIG. 7 which is an enlarged sectional view of part VII in FIG. 1.

Figures 8A, 8B, 8C:
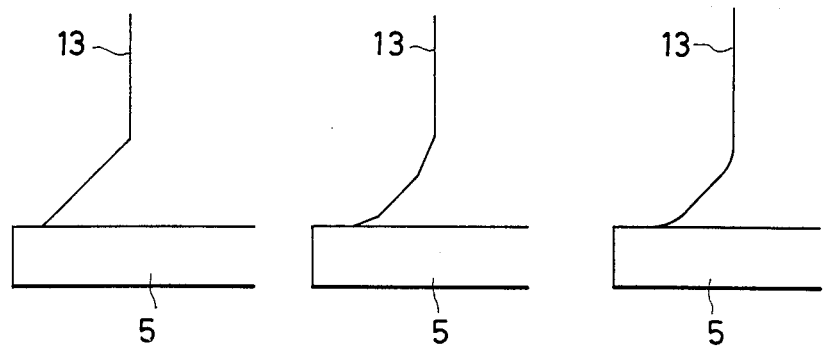
FIGS. 8(a), (b), (c) show the curvature in the vicinity of flange.
Figure 9:
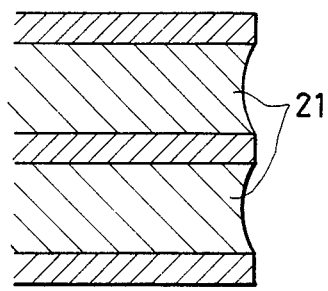
FIG. 9 is a partial sectional view of a conventional anti-seismic rubber bearing.

The curvature is not limited to the one shown in FIG. 7; but it may be of any other form such as the one shown in FIG. 8(a) or 8(b) which is a straight line or a combination of two or more straight lines or the one shown in FIG. 8(c) which is a combination of arcs and straight liens.

In the case of the anti-seismic rubber bearing shown in FIG. 1, the rigid plate 12 has the outwardly rounded edge and the periphery of the rigid plates is covered with the outer layer of special rubber 14. The rounded edge of the rigid plate 12 should have a radius of curvature (r) greater than 0.1 mm, preferably greater than 0.3 mm, and more preferably greater than 0.5 mm.

Figures 10A, 10B, 10C:
FIG. 10(a), (b), (c) show the examples of the round edge of the rigid plate.

The curvature of the rounded edge of the rigid plate is not limited to the one shown in FIG. 1; but it may be of any other form so long as it reduces the local stress. For example, the ones shown in FIGS. 10(a) and 10(b) are composed of a plurality of short straight lines, and the one shown in FIG. 10(c) is a combination of arcs and straight lines.

The smoothly rounded edge of the rigid plate 12 greatly reduces the stress or strain that occurs at that part of the flexible plate 11 which is in contact with the edge.

In an attempt to reduce the tensile strain that occurs in the surface layer of the anti-seismic rubber bearing under the static load and at the time of earthquake, the present inventors studied the surface rubber 23 that covers the laminate structure as shown in FIG. 12. (The part extending from the edge of the rigid plate to the external surface (or the layer having a thickness of T in FIG. 12) is referred to as the covering layer.)

The local strain that occurs in the surface layer exposed to the atmosphere decreases as the thickness T of the covering layer increases. However, the reduction of local stress levels off when exceeding a certain thickness of the covering layer. On the other hand, as the thickness of the covering layer increases, the anti-seismic rubber bearing requires a more amount of material and a prolonged vulcanization time, which leads to an increased cost.

For reasons mentioned above, the thickness T of the covering layer should be 1 to 30 mm, preferably 2 to 20 mm, and most desirably 3 to 15 mm. In the case where the anti-seismic rubber bearing is required to have fireproof and other special performance, the covering layer may be thicker than 30 mm.

Since the anti-seismic rubber bearing is exposed to the atmosphere at all times, it should be protected with rubber having outstanding weather resistance. The anti-seismic rubber bearing in one example of the invention as shown in FIG. 1 is covered with a special rubber 14 having superior weather resistance. Examples of the special rubber include butyl rubber, acryl rubber, polyurethane, silicone rubber, fluororubber, polysulfide rubber, ethylene-propylene rubber (EPR and EPDM), Hypalon, chlorinated polyethylene, ethylene-vinyl acetate rubber, epichlorohydrin rubber, and chloroprene rubber. Preferable among them from the standpoint of weather resistance are butyl rubber, polyurethane, ethylene-propylene rubber, Hypalon, chlorinated polyethylene, ethylene-vinyl acetate rubber, and chloroprene rubber. Preferable among them from the standpoint of adhesion to the rubber constituting the flexible plates are butyl rubber, ethylene-propylene rubber, and chloroprene rubber.

These rubber materials may be used individually or in combination with one another. For the improvement of their elongation and other physical properties, they may be blended with commercial rubber such as natural rubber, isoprene rubber, styrene butadiene rubber, butadiene rubber, and nitrile rubber. In addition, these rubber materials may be incorporated with additives such as filler, antioxidant, plasticizer, softener, and oil which are commonly used for rubber processing. A preferred rubber compound is composed of 100 parts by weight of ethylene-propylene rubber, 5–50 parts by weight of cyclopentadiene or dicyclopentadiene resin, and 2–30 parts by weight of rosin. This rubber compound is greatly improved in fracture properties and adhesion to metals.

Among the above-mentioned rubber materials, ethylene-propylene rubber is superior in ozone resistance, radiation resistance, oxidation resistance, UV light resistance, heat aging resistance, and low temperature performance. However, it is not necessarily satisfactory in adhesion to rubber flexible plates, adhesion to metal rigid plates, processability, and rupture properties such as elongation at break. The properties of ethylene propylene rubber are improved when it is incorporated with cyclopentadiene resin and/or dicyclopentadiene resin and rosin derivative. These additives are also effective in the improvement of weather resistance.

The cyclopentadiene resin or dicyclopentadiene resin improves the processability of the rubber and also improves the physical properties of the rubber through the mutual chemical and physical reactions with rubber that take place during vulcanization. To be more specific, cyclopentadiene resin or dicyclopentadiene resin is superior to ordinary process oil. It can be readily blended with rubber with a less amount of heat generated. It affects little the rupture properties of the rubber compound blended with it. It provides a rubber compound superior in adhesion to metals. (This is true particularly for ethylene-propylene rubber-based compounds.) It does not migrate from the rubber compound but ensures the properties of the rubber compound over a long period of time.

The cyclopentadiene resin or dicyclopentadiene resin to be incorporated into ethylene-propylene rubber-based compounds is a petroleum resin composed mainly of cyclopentadiene or dicyclopentadiene. It includes copolymers of cyclopentadiene or dicyclopentadiene with a polymerizable olefin hydrocarbon and also includes polymers of cyclopentadiene and/or dicyclopentadiene. These results should contain more than 30 wt%, preferably more than 50 wt% of cyclopentadiene or dicyclopentadiene or a mixture thereof.

The olefin hydrocarbon copolymerizable with cyclopentadiene or dicyclopentadiene includes olefin hydrocarbons such as 1-butene, 2-butene, isobutylene, 1-pentene, 2-pentene, 2-methyl-1-butene, 3-methyl-1-butene, and 2-methyl-2-butene; diolefin hydrocarbons such as butadiene, isoprene, and 3-methyl-1,2-butadiene; and vinyl-substituted aromatic hydrocarbons such as styrene, α-methylstyrene, and vinyltoluene. They can be copolymerized with cyclopentadiene or dicyclopentadiene through Friedel-Crafts reaction in the presence of a proper catalyst.

In view of the molecular weight and the reactivity of the double bond, the cyclopentadiene resin or dicyclopentadiene resin should preferably have a softening point of 50°–200° C. (measured by ring and ball method according to JIS K-5902) and a bromine number of 40–150 (measured according to ASTM D-1158-57T) so that they produce a desired effect on the physical properties of the vulcanized rubber.

The amount of the cyclopentadiene and/or dicyclopentadiene to be incorporated should be 5 to 50 parts by weight, preferably 15 to 35 parts by weight for 100 parts by weight of ethylene-propylene rubber-based compound.

The rosin derivative is composed mainly of a mixture of carboxylic acids such as abietic acid and pimaric acids, and it includes, for example, rosin ester, polymeric rosin, hydrogenated rosin, hardened rosin, high rosin, zinc resinate, and modified rosin. The rosin derivative is added in an amount of 2-30 parts by weight for 100 parts by weight of ethylene-propylene rubber-based compound.

The ethylene-propylene rubber includes ethylene-propylene diene rubber (EPDM) containing diene as a third component, ethylene-propylene rubber (EPR) not containing a third component, oil-extended ethylene-propylene diene rubber, and oil-extended EPR. The ethylene-propylene rubber may be blended with general-purpose rubber such as NR, BR, and SBR according to need for the improvement of processability.

The rubber compound may be incorporated with a vulcanization accelerator selected according to the application. Examples of the vulcanization accelerator include thiazole type accelerators, guanine type accelerators, thiuram type accelerators, and thiocarbamate type accelerators. Preferable among them are N-cyclohexyl-2-benzothiazole sulfenamide, dibenzothiazyl disulfide, tetramethylthiuram monosulfide, 2-mercaptobenzothiazole, 2-mercaptobenzothiazole cyclohexylamine salt, tetra-2-ethylhexylthiuram disulfide, zinc di-2-ethylhexyldicarbamate, and diphenylguanidine. Particularly desirable among them are N-cyclohexyl-2-benzothiazole sulfenamide and diphenyl guanidine. The desired amount of the vulcanization accelerator is 0.5 to 5 parts by weight. The rubber compound may further contain a filler, antioxidant, plasticizer, softener, and oil which are commonly used for rubber processing.

According to the present invention, the above-mentioned covering layer should be made of a special rubber compound superior in weather resistance, and it should have a thickness of T specified above. If this is impossible to realize for technical or other reasons, it is not always necessary that the thickness t in FIG. 7 be equal to the thickness T of the covering layer. In such a case, the thickness t of the special rubber compound may be 1-20 mm, preferably 2-20 mm, and most preferably 2-15 mm. The special rubber compound B is required to firmly bond to the flexible plates 11, rigid plates 12, and flanges 4 and 5. Bonding may be easily accomplished by any one of the following methods.

(a) The rubber material for the flexible plates 11 (referred to as inner rubber) and the special rubber compound are vulcanized simultaneously.
(b) The inner rubber is vulcanized first and subsequently the special rubber compound is vulcanized.
(c) The inner rubber and the special rubber compound are vulcanized separately and then they are bonded together with an adhesive.

The bonding of the inner rubber and the special rubber compound may be promoted by interposing a third rubber layer between them which adheres well to both of them. In addition, the inner rubber and/or the special rubber compound may be incorporated with additives for the improvement of adhesion.

As shown in FIG. 1, the anti-seismic rubber bearing of the invention is characterized by that the rigid plates have the outwardly rounded edge and the edge of the rigid plates are covered with a special rubber compound in an adequate thickness. This construction decreases local strain that occurs near the flanges, distributes strain evenly throughout the anti-seismic rubber bearing, and lowers the absolute value of local strain.

There may be an instance where local strain near the flanges is reduced owing to the construction as shown in FIG. 1 but local strain in other parts becomes great and the maximum local strain remains unreduced. To avoid such an instance, the following factors should be properly balanced with one another.

(1) The curvature at the corner formed by the flange and the exterior face of the laminate structure.
(2) The shape of the outwardly rounded edge of the rigid plates.
(3) The thickness of the covering layer covering the laminate structure.

It has become possible to balance these factors by the aid of FEM calculations for great deformation which was developed by the present inventors.

The rigid plates 12 may be made of metal, ceramics, plastics, FRP, polyurethane, wood, paperboard, slate, and decorative laminate, with steel plate being preferable. The flexible plates 11 may be made of vulcanized rubber, unvulcanized rubber, foams thereof, and any other materials having rubbery resilience, with vulcanized rubber being preferable. The shape of the rigid plates and flexible plates may be circle, square, pentagon, hexagon, or polygon. The bonding of the rigid plates to the flexible plates may be accomplished with an adhesive or by covulcanization.

The anti-seismic rubber bearing undergoes great shear deformation as the building rocks when an earthquake occurs. This shear deformation leads to an extremely great local strain at the surface layer of the flexible plate adjacent to the flange of the laminate structure. This local strain leads to damage and rupture of the anti-seismic rubber bearing. Since this local strain results from the flexural deformation of the rigid plate adjacent to the flange, it should be avoided by at least one of the following provisions in the present invention.

(I) Make the flexural rigidity of the rigid plate adjacent to the flange higher than that of the rigid plate closer to the center.
(II) Make the tensile strength of the flexible plate adjacent to the flange higher than that of the flexible plate closer to the center.

When the rigid plates are not uniform in flexural rigidity and/or the flexible plates are not uniform in tensile strength; the rigid plates do not undergo flexural deformation easily. This reduces local strain caused by the flexural deformation of the rigid plate adjacent to the flange. As the result, the anti-seismic rubber bearing is safe with certainty from damage and fracture cuased by local strain.

In the case of the above provision (I), the rigid plates of varied flexural rigidity should be arranged as shown in FIG. 13 so that the following conditions are satisfied.

Assuming that the rigid plates are designated $S_1$, $S_2$, $S_3$, ... $S_M$ ($S_M$ being at the center) and their respective values of flexural rigidity at 25° C. are $E_{S1}$, $E_{S2}$, $E_{S3}$, ... $E_{SM}$, the following relation should be established between the flexural ridigity $E_{S1}$ of the rigid plate $S_1$ and the flexural rigidity $E_{SM}$ of the rigid plate $S_M$.

$$1 \leq E_{S1}/E_{SM} \leq 200$$

preferably $$1 \leq E_{S1}/E_{SM} \leq 75$$

more preferably $$1 \leq E_{S1}/E_{SM} \leq 50$$

In addition, the following relation should be established between the flexural rigidity $E_{S2}$ of the rigid plate $S_2$ and the flexural rigidity $E_{SM}$ of the rigid plate $S_M$.

$$1 \leq E_{S2}/E_{SM} \leq 50$$

preferably $$1 \leq E_{S2}/E_{SM} \leq 30$$

If necessary, the flexural rigidity $E_{S3}$ of the rigid plate $S_3$ may be greater than the flexural rigidity $E_{SM}$ of the rigid plate $S_M$.

In this case, the respective values of flexural rigidity $E_{S1}, E_{S2}, E_{S3}, \ldots E_{SM}$ of the rigid plates $S_1, S_2, S_3, \ldots S_M$ may be set up so as to satisfy the following conditions. $E_{S1} \geq E_{S2} \geq E_{S3} \geq \ldots \geq E_{SM}$ (provided that the case in which $E_{S1} = E_{S2} = E_{S3} = \ldots = E_{SM}$ is excluded). It is also possible to set up randomly such that each of $E_{S1}, E_{S3}$, and $E_{S7}$ (the flexural rigidity of the 7th rigid plate $S_7$ counted from the flange side) is greater than $E_{SM}$. In short, according to the present invention, the rigid plate adjacent to the flange should have a higher flexural rigidity than the rigid plate closer to the center. The flexural rigidity of the individual rigid plates should be properly established according to the estimated direction and magnitude of shocks applied to the anti-seismic rubber bearing.

There are several possible ways to make the flexural rigidity of the rigid plate adjacent to the flange higher than that of the rigid plate closer to the center. The following two ways are adequate.

(1) The rigid plate adjacent to the flange and the rigid plate closer to the center are made of the same material but the former is thicker than the latter.
(2) The rigid plate adjacent to the flange and the rigid plate closer to the center are made of different materials, the material for the former having a higher flexural rigidity than that for the latter.

In the case of (1), the plate thickness to give a flexural rigidity required is easily calculated because doubling the plate thickness increases the flexural rigidity $2^3$-fold.

In the case of the above provision (II), the flexible plates of varied tensile strength should be arranged so as to satisfy the following conditions.

Assuming that the flexible plates are designated $R_1, R_2, R_3, \ldots R_M$ ($R_M$ being at the center) and their respective values of tensile strength at 100% elongation (modulus 100) at 25° C. are $E_{R1}, E_{R2}, E_{R3}, \ldots E_{RM}$, the following relation should be established between the tensile strength $E_{R1}$ of the flexible plate $R_1$ and the stress $E_{RM}$ of the flexible plate $R_M$.

$$1 \leq E_{R1}/E_{RM} \leq 50$$

preferably $$1 \leq E_{R1}/E_{RM} \leq 30$$

more preferably $$1 \leq E_{R1}/E_{RM} \leq 15$$

In addition, the following relation should be established between the tensile stress $E_{R2}$ of the flexible plate $R_2$ and the tensile strength $E_{RM}$ of the flexible plate $R_M$.

$$1 \leq E_{R2}/E_{RM} \leq 15$$

preferably $$1 \leq E_{R2}/E_{RM} \leq 10$$

If necessary, the tensile strength $E_{R3}$ of the flexible plate $R_3$ may be made greater than the tensile strength $E_{RM}$ of the flexible plate $R_M$.

In this case, the respective values of tensile strength $E_{R1}, E_{R2}, E_{R3}, \ldots E_{RM}$ of the flexible plates $R_1, R_2, R_3, \ldots R_M$ may be set up so as to satisfy the following conditions. $E_{R1} \geq E_{R2} \geq E_{R3} \geq \ldots \geq E_{RM}$ (provided that the case in which $E_{R1} = E_{R2} = E_{R3} = \ldots = E_{RM}$ is excluded). It is also possible to set up such that each of $E_{R1}, E_{R3}$, and $E_{R7}$ (the tensile strength of the 7th flexible plate $R_7$ counted from the flange side) is greater than $E_{RM}$.

There are several possible ways to make the tensile strength the flexible plate adjacent to the flange higher than that of the flexible plate closer to the center. The following two ways are adequate.

(1) The flexible plate adjacent to the flange and the flexible plate closer to the center are made of the same base material but the base material for the former contains more filler than that for the latter.
(2) The flexible plate adjacent to the flange and the flexible plate closer to the center are made of different base materials, the base material for the former having a higher tensile stress than that for the latter.

According to the present invention, it is desirable that the flexible plate $R_M$ at the center should have a tensile strength $E_{RM}$ of 5–40 kg/cm$^2$ at 100% elongation at 25° C.

The above-mentioned provisions I and/or II reduces local strain resulting from the flexural deformation of the rigid plate adjacent to the flange. This protects the anti-seismic rubber bearing from damage and rupture by local strain.

The laminate structure is constructed according to the above-mentioned provision I or II or both. If both of the above-mentioned provisions I and II are adopted, the rigid plate adjacent to the flange is by far less subject to flexural deformation. Therefore, local strain caused by the flexural deformation of the rigid plate is certainly reduced.

The anti-seismic rubber bearing of the present invention not only isolates the motions of earthquake but also performs damping and vibration proofing. It has the following features.

(1) Local strain does not concentrate near the flange but distributes evenly throughout the anti-seismic rubber bearing.
(2) The maximum local strain that occurs in the anti-seismic rubber bearing is greatly reduced.

Because of these features, the anti-seismic rubber bearing of the invention is safe from damage and rupture caused by local strain.

As mentioned above, the anti-seismic rubber bearing of the invention is subject very little to damage and rupture caused by local strain on account of the remarkable reduction of local strain. Therefore, it is very durable. Since it can be fixed to the building and foundation through the flanges, it can stably support the building.

The durability and safety of the anti-seismic rubber bearing are enhanced if the laminate structure of the anti-seismic rubber bearing is covered with a special rubber compound.

The anti-seismic rubber bearing of the present invention was realized as the result of quantitative analysis of local strain that occurs when the anti-seismic rubber bearing undergoes deformation. Therefore, it should be clearly distinguished from the conventional ones, and the present invention is of great scientific and industrial significance.

The invention is now described in more detail with reference to the following examples.

EXPERIMENT EXAMPLE 1

The anti-seismic rubber bearing of the invention as shown in FIG. 1 was examined for principal strain at each position that occurs at the time of deformation. The flexible plates were made of vulcanized natural rubber-based compound, and the rigid plates were made of steel plate. This special rubber was vulcanized rubber composed of 100 parts by weight of EPDM-based rubber, 21 parts by weight of dicyclopentadiene resin, 9 parts by weight of high rosin, and carbon black.

The anti-seismic rubber bearing has the following dimensions.

| | |
|---|---|
| Thickness of flexible plate: | k = 10 mm |
| Thickness of rigid plate: | h = 2 mm |
| Length of rigid plate: | l = 70 mm |
| Thickness of special rubber: | t = 5 mm |
| Shape factor: | l/4k = 1.75 |
| Radius of curvature of edge of rigid plate: | r = 1 R (arc having a radius of 1 mm) |
| Radius of curvature at corners of laminate structure: | L = 0.92 × (h + k) = 11.04 mm |

Figure 14:
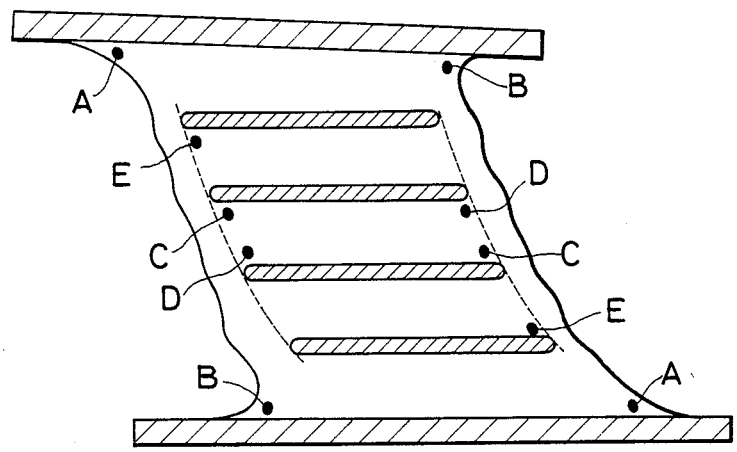
FIG. 14 is a schematic diagram showing the deformation of the anti-seismic rubber bearing of the invention which occurs in the experiment example.

The anti-seismic rubber bearing of this structure was subjected to 6% compressive strain and 100% shear strain. The deformed shape under such strain is schematically shown in FIG. 14. The values of FEM analysis for the principal strain at each position indicated in FIG. 14 are shown in Table 1.

Figure 5:
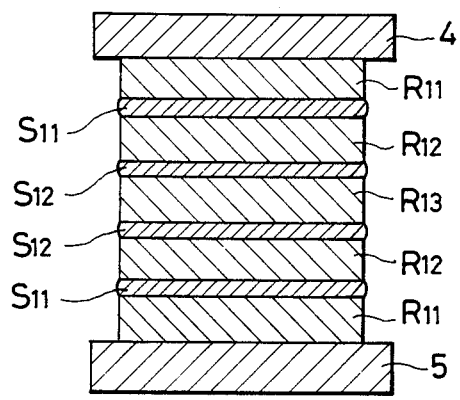
FIG. 5 is a sectional view of an anti-seismic rubber bearing used for the analysis of principal strain.
Figure 6:
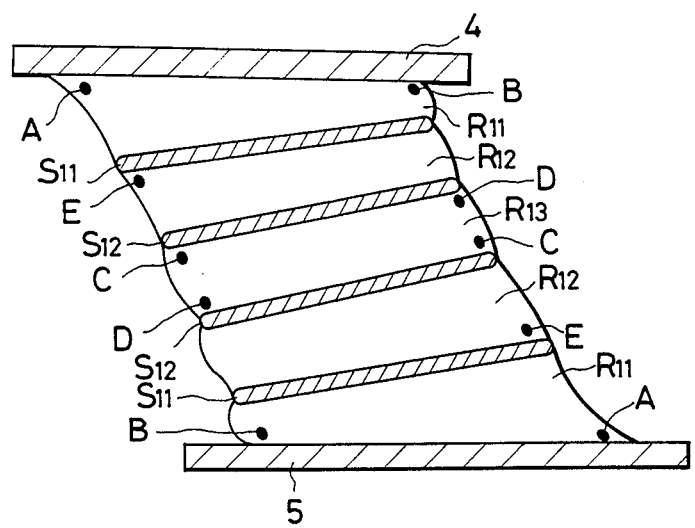
FIG. 6 is a schematic diagram showing the deformation of the anti-seismic rubber bearing shown in FIG. 5.

In a comparative example, an anti-seismic rubber bearing as shown in FIG. 5 was prepared (the material, shape factor, rubber thickness, and steel plate thickness are the same as those in the example). It was also examined in the same manner as in the example. The principal strain at each position indicatd in FIG. 6 was measured, and the measured values are shown in Table 1.

TABLE 1

| Position | Comparative Example | Example |
|---|---|---|
| A | 138% (*1) | 62% |
| B | 138% (*1) | 73% |
| C | 51% | 38% |
| D | 51% | 85% |
| E | 80% | 108% (*2) |

(*1) Maximum strain in Comparative Example
(*2) Maximum strain in Example

It is noted from Table 1 that the following are achieved with anti-seismic rubber bearing of the invention and the effect of the invention is quite apparent.
(1) Great reduction of local strain at the tensile side and compressive side near the flange.
(2) Even distribution of local strain throughout the anti-seismic rubber bearing.
(3) Great reduction of the maximum local strain.

EXPERIMENT EXAMPLE 2

The following two kinds of rubber sheets were examined for heat deterioration by heating at 100° C. in an air oven for 10 days.
(i) NR-based rubber sheet (2 mm thick)
(ii) NR-based rubber sheet covered (on both sides) with EPDM rubber (4 mm thick)

The physical properties measured after heating are shown in Table 2. For comparison, the physical properties of the first sample were also measured without heating.

TABLE 2

| Properties | NR rubber heated | EPDM-coated NR rubber heated | NR rubber not heated |
|---|---|---|---|
| Strength at break (kg/cm$^2$) | 28 | 216 | 263 |
| Elongation at break (%) | 270 | 670 | 700 |
| Number of flexings to break | | | |
| with 100% strain (× 10$^4$) | 3.4 | 15 | 15 |
| with 200% strain (× 10$^2$) | 4.5 | 250 | 200 |

EXPERIMENT EXAMPLE 3

The same specimens of NR rubber and EPDM-coated NR rubber as used in Experiment Example 2 were examined for ozone resistance. They were exposed to 100 pphm ozone at 40° C. with 50% stretching, and the time required for cracks to occur was measured. In the case of NR rubber, cracking occurred within 1 hour; whereas in the case of EPDM-coated NR rubber, no cracking occurred even after 2000 hours.

The results of Experiment Examples 2 and 3 indicate that ordinary rubber can be protected almost completely form deterioration if it is coated with weather-resistant rubber.

EXPERIMENT EXAMPLE 4

Five rubber compounds of the formulation as shown in Table 3 were prepared and examined for physical properties. The results are also shown in Table 3. (The measurement of physical properties was carried out at 25° C.)

The rubber compounds Nos. 1 and 2 were examined for weather resistance, and the results were compared with those of a natural rubber compound No. 6 (composed of 100 parts by weight of natural rubber, 20 parts by weight of HAF carbon, 10 parts by weight of spindle oil, 1.5 parts of sulfur, and 1 part by weight of antioxidant). The results are shown in Table 4.

It is noted from Table 3 that rubber compounds Nos. 4 and 5 are small in elongation at break, poor in adhesion to steel plates, and extremely poor in adhesion to natural rubber, whereas rubber compounds Nos. 1 to 3 blended with dicyclopentadiene resin and high rosin are superior in strength at break and elongation at break and are also superior in adhesion to natural rubber and metal.

It is noted from Table 4 that rubber compounds Nos. 1 and 2 are excellent in ozone resistance, retention of strength at break and elongation at break after heat deterioration,. and flex resistance after heat deterioration. Apparently they are superior in resistance to heat deterioration.

TABLE 3

| Rubber compound No. | 1 | 2 | 3 | 4 | 5 |
|---|---|---|---|---|---|
| Formulation (parts by weight) | | | | | |
| Rubber | | | | | |
| EPDM alone | — | — | — | — | 100 |
| EPDM/NR = 70/30 | 100 | 100 | 100 | 100 | — |

TABLE 3-continued

| Rubber compound No. | 1 | 2 | 3 | 4 | 5 |
|---|---|---|---|---|---|
| ISAF carbon | 40 | 40 | 40 | 30 | 30 |
| Cyclopentadiene resin*[1] | 18 | 14 | 21 | — | — |
| High rosin | 9 | 14 | 9 | — | — |
| Spindle oil | — | — | — | 20 | 20 |
| Sulfur | 1.5 | 1.5 | 1.5 | 1.5 | 1.5 |
| Vulcanization accelerator*[2] | | | | | |
| CZ | 2.7 | 2.5 | 2.5 | — | — |
| TS | — | — | — | 2.3 | 2.3 |
| DPG | — | — | 1 | — | — |
| Antioxidant 810NA | 1 | 1 | 1 | 1 | 1 |
| Physical properties | | | | | |
| Modulus ($M_{100}$) at 100% elongation (kg/cm$^2$) | 17 | 14 | 14 | 23 | 19 |
| Elongation at break (%) | 700 | 800 | 780 | 370 | 280 |
| Strength at break (kg/cm$^2$) | 141 | 152 | 156 | 78 | 80 |
| Rubber/rubber bond strength (kg/inch)*[3] | 70 | 70 | 80 | 20 | 6 |
| Rubber/metal bond strength (kg/inch)*[4] | 87 | 80 | 87 | 40 | 35 |

*[1]Polymer of dicyclopentadiene. Softening point: 116° C., iodine value: 65
*[2]CZ: N—cyclohexyl-2-benzothiazolesulfenamide
TS: Tetramethylthiuram monosulfide
DPG: Diphenyl guanidine
Antioxidant 810NA: N—isopropyl-N'—phenyl-p-phenylenediamine
*[3]Bond strength between the specimen and the natural rubber compound.
*[4]Bond strength between the specimen and the metal plate.

TABLE 4

| Rubber compound No. | 1 | 2 | 7 |
|---|---|---|---|
| Ozone resistance*[1] | No cracking occurred after 2000 hours | | Many cracks after 2 hrs |
| Resistance to heat aging*[2] | | | |
| Retention of elongation at break | 0.7 | 0.75 | 0.30 |
| Retention of strength at break | 0.74 | 0.72 | 0.09 |
| Number of flexings to break | $7 \times 10^3$ | $5 \times 10^3$ | 20 |

*[1]Tested in 90 pphm ozone at 40° C. with 50% stretching.
*[2]Measured at 25° C. after heat deterioration in an air oven at 100° C. for 20 days.

What is claimed is:

1. An anti-seismic rubber bearing adapted to be fixed to a building and foundation, comprising:
   two flanges,
   a laminate structure securely connected between the flanges, said laminate structure including a plurality of rigid plates with stiff properties, each rigid plate having a rounded edge around an outer periphery thereof, and a plurality of flexible plates with viscoelastic properties, said rigid plates and flexible plates being laminated alternately so that upper most and lower most plates are flexible plates and fixedly bonded together, upper and lower peripheries of the laminate structure having curved corners smoothly extending from the outer periphery to the flanges so that local strain, when occurred around the flanges, is evenly distributed throughout the structure, and
   a rubber compound covering the laminate structure.

2. Am anti-seismic rubber bearing as claimed in claim 1 wherein the curvature formed near the flanges is an arc having a radius L defined as follows:

$$(1/15)(h+k) \leq L \leq 5(h+k)$$

where h denotes the thickness of the rigid plate and k denotes the thickness of the flexible plate.

3. An anti-seismic rubber bearing as claimed in claim 1, wherein the edge of the rigid plate is an arc having a radius of r defined by $r \leq 0.1R$ where R is an arc having a radius of 1 mm.

4. An anti-seismic rubber bearing as claimed in claim 1, wherein the special rubber is one which is superior in weather resistance.

5. An anti-seismic rubber bearing in claim 4, wherein the special rubber is composed of 100 parts by weight of rubber whose principal component is ethylene-propylene rubber, 5 to 50 parts by weight of cyclopentadiene resin and/or dicyclopentadiene resin, and 2 to 30 parts by weight of rosin derivative.

6. An anti-seismic rubber bearing as claimed in claim 1, wherein the special rubber layer covering the exterior face of the laminate structure has s thickness of 1 to 30 mm.

7. An anti-seismic rubber bearing as claimed in claim 1, wherein the rigid plate adjacent to the flange has a higher flex rigidity than that closer to a center.

8. An anti-seismic rubber bearing as claimed in claim 1, wherein the flexible plate adjacent to the flange has a higher tensile strength than that closer to a center.

9. An anti-seismic rubber bearing as claimed in claim 1 wherein the rubber compound covering the laminate structure is different from a material of the flexible plates.

10. An anti-seismic rubber bearing adapted to be situated between a building and foundation, comprising:
    two flanges fixed to the building and foundation, respectively,
    a laminate structure securely connected between the flanges, said laminate structure including a plurality of rigid plates with stiff properties, each rigid plate having a rounded edge around an outer periphery thereof, and a plurality of flexible plates with viscoelastic properties, said rigid plates and flexible plates being laminated alternately so that upper most and lower most plates are flexible plates and fixedly bonded together, said laminate structure having a size smaller than the flanges so that the flanges extend laterally outwardly beyond the flanges, and
    covering means securely connected to the laminate structure to entirely cover the same, said covering means having curved corner portions adjacent the flanges to smoothly extend from an outer periphery of the covering means to the flanges so that local strain, when occurred around the flanges, is entirely distributed throughout the laminate structure.

11. An anti-seismic rubber bearing as claimed in claim 10, wherein each curved corner portion of the covering means has an arc having a radius L defined as follows:

$$(1/15)(h+k) \leq L \leq 5(h+k)$$

wherein h denotes thickness of the rigid plate and k denotes thickness of the flexible plate.

12. An anti-seismic rubber bearing as claimed in claim 11, wherein the edge of the rigid plate has an arc having a radium of r defined by $r \leq 0.1R$, where R is an arc having a radius of 1 mm.

* * * * *